United States Patent
Nomizu et al.

(10) Patent No.: US 12,061,936 B2
(45) Date of Patent: Aug. 13, 2024

(54) COMPUTER SYSTEM AND PROGRAM EXECUTION METHOD

(71) Applicant: HITACHI, LTD., Tokyo (JP)

(72) Inventors: Takuma Nomizu, Tokyo (JP); Hidehiro Kawai, Tokyo (JP); Masaaki Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 460 days.

(21) Appl. No.: 17/618,016

(22) PCT Filed: Mar. 5, 2020

(86) PCT No.: PCT/JP2020/009409
§ 371 (c)(1),
(2) Date: Dec. 10, 2021

(87) PCT Pub. No.: WO2021/002054
PCT Pub. Date: Jan. 7, 2021

(65) Prior Publication Data
US 2022/0261298 A1    Aug. 18, 2022

(30) Foreign Application Priority Data
Jul. 4, 2019 (JP) .................... 2019-125471

(51) Int. Cl.
*G06F 9/52* (2006.01)
(52) U.S. Cl.
CPC .................... *G06F 9/52* (2013.01)
(58) Field of Classification Search
None
See application file for complete search history.

(56) References Cited

U.S. PATENT DOCUMENTS 8,196,027 B2 * 6/2012 Weiberle ........... G06F 11/1675
  712/215
9,015,373 B2 * 4/2015 Deguchi ........... G06F 3/0671
  710/36

(Continued)

FOREIGN PATENT DOCUMENTS

JP    2004046356 A    2/2004
JP    2009217503 A    9/2009

(Continued)

OTHER PUBLICATIONS

S. Bhattacharyya et al.; "Verification of Quasi-Synchronous Systems With Uppaal"; 2014 IEEE; (NPL: Bhattacharyya_2014.pdf; pp. 1-12) (Year: 2014).*

(Continued)

*Primary Examiner* — Hiren P Patel
(74) *Attorney, Agent, or Firm* — MATTINGLY & MALUR, PC

(57) ABSTRACT

A synchronous core processing unit executes the same program as a program executed by another computer for an execution unit at a synchronization timing synchronized with a synchronous core processing unit of the other computer, and migrates the program being executed for which migration is requested according to characteristics of the program to a quasi-synchronous core processing unit. The quasi-synchronous core processing unit executes the program migrated from the synchronous core processing unit, and then migrates the program to the synchronous core processing unit. The synchronous core processing unit outputs, to an output comparison machine, an execution result obtained by executing the program migrated from the quasi-synchronous core processing unit at the synchronization timing.

7 Claims, 2 Drawing Sheets

(56) References Cited

U.S. PATENT DOCUMENTS

| | | | |
|---|---|---|---|
| 10,860,486 B2* | 12/2020 | Hayakawa | G06F 11/1641 |
| 2004/0117793 A1* | 6/2004 | Shaylor | G06F 9/4881 |
| | | | 718/100 |
| 2004/0215987 A1* | 10/2004 | Farkas | G06F 9/5088 |
| | | | 713/300 |
| 2006/0026214 A1* | 2/2006 | Berg | G06F 9/5027 |
| 2008/0270660 A1* | 10/2008 | Weiberle | G06F 11/1641 |
| | | | 710/261 |
| 2008/0270747 A1* | 10/2008 | Pfeiffer | G06F 9/30189 |
| | | | 712/E9.035 |
| 2013/0024865 A1* | 1/2013 | Yamauchi | G06F 9/4843 |
| | | | 718/102 |
| 2013/0167154 A1* | 6/2013 | Peng | G06F 9/5083 |
| | | | 718/105 |
| 2018/0060048 A1* | 3/2018 | Gampe | G06F 9/4552 |
| 2022/0261298 A1* | 8/2022 | Nomizu | G06F 11/18 |

FOREIGN PATENT DOCUMENTS

| | | |
|---|---|---|
| JP | 2012194615 A | 10/2012 |
| JP | 2016031651 A | 3/2016 |

OTHER PUBLICATIONS

International Search Report of PCT/JP2020/009409 dated Jun. 9, 2020.
Japanese Office Action received in corresponding Japanese Application No. 2019-125471 dated Aug. 30, 2022.

* cited by examiner

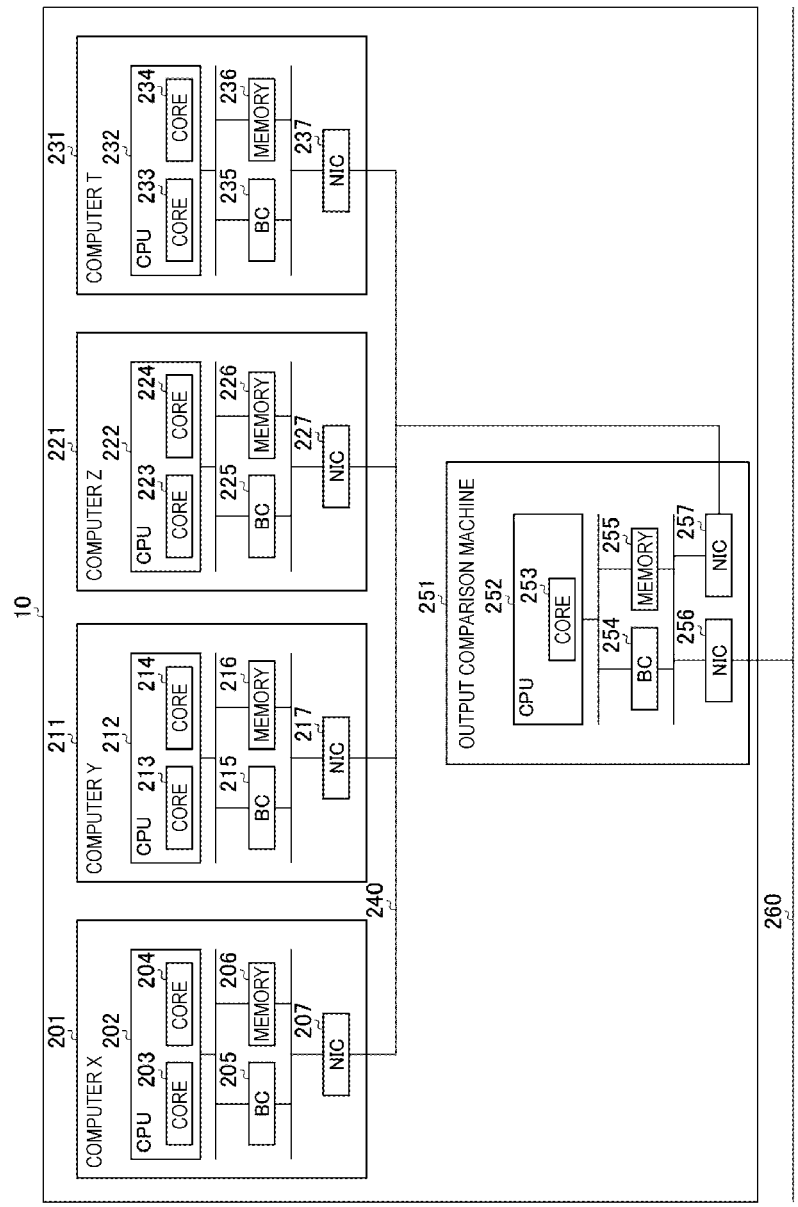
[FIG. 1]

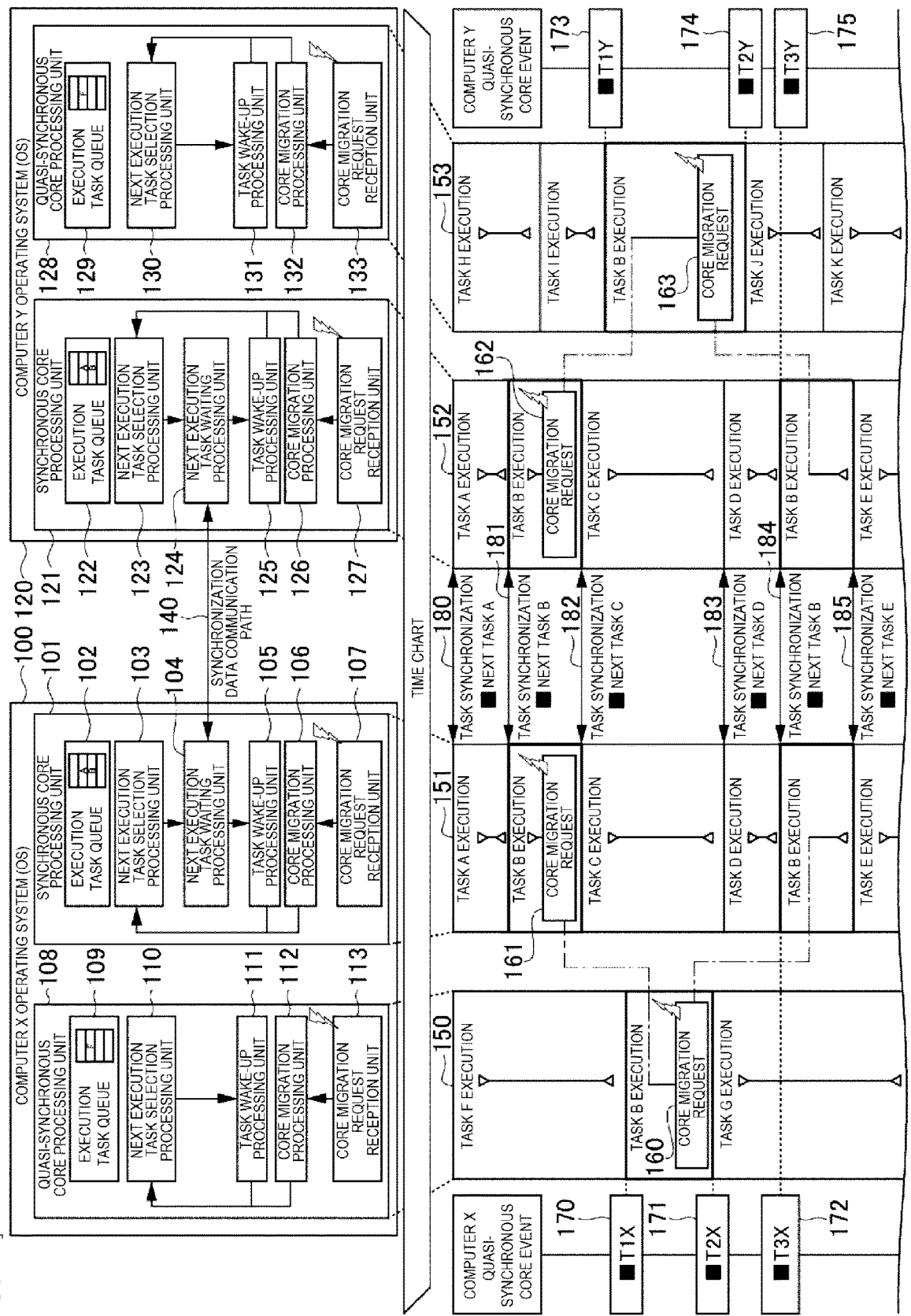
[FIG. 2]

COMPUTER SYSTEM AND PROGRAM EXECUTION METHOD

TECHNICAL FIELD

The present invention relates to a computer system and a program execution method.

BACKGROUND ART

There is a fault tolerant computer as a technique for implementing non-stop operation of a system. The fault tolerant computer runs the same program on plural central processing units (CPUs) by hardware that multiplexes CPUs, a memory, an input and output (I/O) bus, and the like, and collates results. Therefore, even if one CPU fails, the other CPUs can continue processing.

There is a technique for constructing a fault tolerant computer using plural loosely coupled general-purpose computers as a method for achieving the same level of multiplicity as this fault tolerant computer without manufacturing dedicated hardware for multiplexing.

For example, PTL 1 describes a loosely coupled fault tolerant computer. That is, PTL 1 discloses that "plural CPUs are connected by a duplex bus to execute the same task, and execution results (instruction outputs) are collated."

CITATION LIST

Patent Literature

PTL 1: JP-A-2009-217503

SUMMARY OF INVENTION

Technical Problem

Incidentally, the loosely coupled fault tolerant computer described in PTL 1 has a mechanism (task synchronization processing) in which specific cores operate synchronously by sharing information on a program to be operated next over a network and waiting for an execution start timing. In this system, in order to increase processing performance per unit time, it is necessary to increase the number of the cores that operate synchronously.

However, in order to increase the number of the cores that operate synchronously, it is necessary to increase computational resources of a communication bandwidth for synchronization, communication hardware, and a device for matching. For example, under a case where in addition to one set of cores performing a synchronization processing, another set of cores performs another synchronization processing, a set of a communication bandwidth for synchronization, communication hardware, and a device for matching is required to be added. Therefore, a system administrator has to consider increasing the hardware or changing a configuration of the system.

The invention has been made in view of such a situation, and an object of the invention is to improve processing performance of a computer system without changing hardware configuration.

Solution to Problem

A computer system according to the invention includes a computer and a comparison machine. The computer includes a synchronous core processing unit and a quasi-synchronous core processing unit whose operation is managed by an operating system, and the synchronous core processing unit and the quasi-synchronous core processing unit are configured to switch a program for a predetermined execution unit and execute a plurality of the programs in parallel. The comparison machine compares execution results of the program executed by a plurality of the computers connected via a network and outputs a comparison result. Information on the program executed by the computer is exchanged between the computer and another computer within a specified time range via the network.

Then, the synchronous core processing unit executes the same program as a program executed by the other computer for the execution unit at a synchronization timing synchronized with a synchronous core processing unit of the other computer, and migrates the program being executed for which migration is requested according to characteristics of the program to the quasi-synchronous core processing unit. The quasi-synchronous core processing unit executes the program migrated from the synchronous core processing unit, and then migrates the program to the synchronous core processing unit. The synchronous core processing unit outputs, to the comparison machine, an execution result obtained by executing the program migrated from the quasi-synchronous core processing unit at the synchronization timing.

Advantageous Effect

According to the invention, the synchronous core processing unit and the quasi-synchronous core processing unit can execute the program in parallel by migrating the program being executed for which the migration is requested according to the characteristics of the program to the quasi-synchronous core processing unit. There is no need of a communication band or new hardware to synchronize and operate the quasi-synchronous core processing units on the plural computers. Therefore, processing performance of the computer system can be improved without changing a hardware configuration of the computers.

Problems, configurations, and effects other than those described above will be clarified by the following description of an embodiment.

BRIEF DESCRIPTION OF DRAWINGS

FIG. 1 is a system configuration diagram of a computer system according to an embodiment of the invention.

FIG. 2 is a configuration example of an operating system running on each computer and a time chart showing an example of task execution for a task synchronization processing according to the embodiment of the invention.

DESCRIPTION OF EMBODIMENTS

Hereinafter, an embodiment for implementing the invention will be described with reference to drawings. In the description and drawings, components having substantially the same function or configuration are designated by the same reference numerals, and redundant description will be omitted.

EMBODIMENT

Hereinafter, an example of a task synchronization processing according to the embodiment of the invention will be described with reference to FIGS. 1 and 2.

<Computer System Configuration Example>

FIG. 1 is a system configuration diagram of a computer system 10 according to the embodiment of the invention.

The computer system 10 has a configuration in which a computer X201, a computer Y211, a computer Z221, a computer T231, and an output comparison machine 251 are connected to a network 240, and the output comparison machine 251 and an external device (not shown) are connected with each other via a network 260.

The computers X201 to T231 (an example of plural computers) do not include a shared memory, disk, or the like, and notify each other what is necessary for a synchronization processing of a program. Therefore, the computer system 10 constitutes a loosely coupled fault tolerant computer that obtains output results from the plural computers. Therefore, in the computer system 10, information on a program to be executed by the computer X201 is exchanged between the computer X201 and the other computers Y211 to T231 within a specified time range via the network 240. That is, the plural computers X201 to t231 exchange information on the program to be executed with each other. The number of computers included in the computer system 10 may be two or more, and is not limited to four computers according to the present embodiment.

The computer X201 includes a central processing unit (CPU) 202, a bus controller (BC) 205, a memory 206, and a network interface card (NIC) 207. Since the computer Y211, the computer Z221, and the computer T231 include the same components as the computer X201, a configuration example of the computer X201 will be described here.

The CPU 202 includes a core 203 and a core 204. Then, there is a configuration in which the CPU 202, the bus controller 205, the memory 206, and the NIC 207 are connected with each other by a bus provided in the computer X201. The number of the CPU 202 mounted on the computer X201 is not limited to one, and the number is not limited as long as the number of cores in the CPU 202 is two or more.

The CPU 202 is used as an example of an arithmetic unit that reads a program code of software that implements each function according to the present embodiment from the memory 206 and executes the software. Variables, parameters, and the like generated during an arithmetic processing of the CPU 202 are temporarily written in the memory 206, and these variables, parameters, and the like are appropriately read by the CPU 202. Other arithmetic units such as a micro processing unit (MPU) may be used instead of the CPU 202.

Cores 203 and 204 running on the CPU 202 are functional units whose operation is managed by an operating system (not shown in FIG. 1), and functions of the cores 203 and 204 are implemented by software programs. Although the details will be described later with reference to FIG. 2, the core 203 is used as, for example, a synchronous core processing unit 101, and the core 204 is used as a quasi-synchronous core processing unit 108. An execution unit of a program executed in the core 203 and 204 is a task (also called a process). In the following description, the program to be executed may be called a task. Depending on characteristics of the program according to the present embodiment, the task to be executed in the core 203 is migrated to the core 204, executed in the core 204, and then returned to the core 203, and the core 203 can execute the returned task.

The bus controller 205 creates a memory space (address) in the memory 206 and controls data written in the memory 206. For example, an execution result of the program executed by the cores 203 and 204 is written in the memory 206. The bus controller 205 manages input and output of data of each device in order to avoid data collision by each device in the computer X201.

Examples of the memory 206 include a read only memory (ROM), a read only memory (RAM), a hard disk drive (HDD), a solid state drive (SSD), a flexible disk, an optical disk, an optical magnetic disk, a CD-ROM, a CD-R, a magnetic tape, a non-volatile memory, and the like. In the memory 206, in addition to the OS (operating system) and various parameters, a program for operating the computer X201 and a program instructed to be executed by the computer X201 are recorded. The memory 206 permanently records a program, data, and the like required for the CPU 202 to operate, and is used as an example of a computer-readable non-transient recording medium that stores the program executed by the computer X201.

The NIC 207 can send and receive various data between devices via a local area network (LAN) connected to a terminal, a dedicated line, or the like.

The computer X201 and another computer (at least one of the computers Y211 to T231) execute the same program at the same timing. Therefore, the computer X201 and the other computer communicate with each other for synchronization data for synchronizing an execution timing of the program. After the program is executed by each computer, an execution result of the program executed by the computer X201 and an execution result of the program executed by the other computer are transferred to the output comparison machine 251 through the network 240.

Execution results of the program executed by the computers X201 to T231 are transmitted to the output comparison machine 251 through the network 240. The output comparison machine 251 receives the execution results of the program executed by the plural computers X201 to T231 connected with each other by the network 240, compares and collates the execution results, and then outputs a collation result to the external network 260.

Meanwhile, the output comparison machine 251 broadcasts data received from the external network 260 to each computer. Then, after the same task of each computer receives the same data, the received data is processed.

The output comparison machine 251 (an example of a comparison machine) includes a CPU 252, a bus controller 254, a memory 255, a NIC 256, and a NIC 257. The CPU 252 includes one core 253. Then, the CPU 252, the bus controller 254, the memory 255, the NIC 256, and the NIC 257 are connected by a bus provided inside the output comparison machine 251.

Operations of the CPU 252, the bus controller 254, the memory 255, and the NICs 256 and 257 included in the output comparison machine 251 are the same as operations of the CPU 202, the bus controller 205, the memory 206, and the NIC 207 included in the computer X201. The NIC 256 is connected to the network 260 and the NIC 257 is connected to the network 240.

The CPU 252 has a function of comparing execution results of a program obtained by two or more computers. The execution results of the computers are input to the NIC 257 and written to the memory 255 through the network 240, and then the core 253 of the CPU 252 executes a comparison collation program. Then, once a comparison collation result obtained by executing the comparison collation program by the core 253 is written in the memory 255, the comparison collation result is output to the network 260 through the NIC 256. For example, the comparison collation result is displayed on a display device or the like connected to the network 260. A user who operates the display device can confirm whether the execution result of each computer is normal or abnormal based on the comparison collation result.

By operating an operating system shown in FIG. 2 described later, even if two of the four computers fail, the remaining two computers execute the same task, and the output comparison machine 251 can compare two pieces of output data of the same task performed. Even if three of the four computers fail, the remaining one can continue executing the task. When only one computer executes the task, the output comparison machine 251 does not perform the comparison of output data.

<Operating System (OS) Configuration Example and Task Execution Method Example>

FIG. 2 is a configuration example of the operating system running on each computer and a time chart showing an example of a task execution method for the task synchronization processing according to the embodiment of the invention. In the description, the operating system is abbreviated as OS.

In FIG. 2, in order to improve readability, configuration examples of an OS 100 of the computer X201 and an OS 120 of computer Y211 will be described. In practice, the computer Z221 and the computer T231 shown in FIG. 1 are also connected to the computer X201 and the computer Y211. The four computers execute the task synchronization processing and output the execution result to the output comparison machine 251.

The OS 100 of the computer X201 and the OS 120 of the computer Y211 include a component that performs the task synchronization processing. The OS 100 and the OS 120 are operating systems having a multi-programming function, and manage a program being executed in an execution unit called a task (also called a process) in order to enable execution of plural programs. The OS 100 and the OS 120 are for multiprocessor use, and can execute tasks in parallel for each core.

The OS 100 and the OS 120 are connected with each other by a synchronization data communication path 140, and exchange synchronization data with each other via the synchronization data communication path 140. In the present embodiment, a next execution task waiting processing unit 104 of the OS 100 and a next execution task waiting processing unit 124 of the OS 120 are connected with each other by the synchronization data communication path 140. In the description, a task to be executed after a currently executed task is referred to as "next execution task".

The present embodiment is not limited to two computers, and the computer system 10 can be constructed multiply using any number of computers. Then, the synchronization data communication path 140 is used as a path connecting plural computers constructed multiply.

The computers X201 and Y211 according to the present embodiment can execute a processing of a program (task) executed in a hierarchy higher than the operating system by classifying the processing into a deterministic processing or a nondeterministic processing. The deterministic processing is a processing in which output results are the same as long as input results are the same. The nondeterministic processing is a processing in which output results are not the same even if input results are the same. For example, the nondeterministic processing is a processing in which output results are not the same when a failure occurs for some reason in hardware that executes the task. The nondeterministic processing is also a processing in which output results are not the same when a task being executed receives different parameters for each computer from another task. Due to influence of disturbance and the like, output results obtained by the synchronous core processing unit in the related art executing a nondeterministic processing task are not the same. However, since the synchronous core processing units 101 and 121 according to the present embodiment are reliably executed synchronously, output results of a nondeterministic processing are the same.

Therefore, in the computer system 10 according to the present embodiment, synchronized cores (synchronous core processing units 101 and 121) execute (synchronously execute) a nondeterministic processing, and non-synchronous cores (quasi-synchronous core processing units 108 and 128) execute (quasi-synchronously execute) a deterministic processing. Same execution results can be obtained in the plural cores from both the executed deterministic processing and the nondeterministic processing. Hereinafter, configuration examples and operation examples of the OS 100 running on the computer X201 and the OS 120 running on the computer Y211 according to the present embodiment will be described in order.

<Configuration Example of OS 100>

First, a configuration example of the OS 100 will be described.

The computer X201 includes the synchronous core processing unit 101 and the quasi-synchronous core processing unit 108 that can switch programs for each task (an example of a predetermined execution unit) managed by the OS 100 and execute plural programs in parallel.

The synchronous core processing unit 101 includes an execution task queue 102, a next execution task selection processing unit 103, the next execution task waiting processing unit 104, a task wake-up processing unit 105, a core migration processing unit 106, and a core migration request reception unit 107. In the synchronous core processing unit 101, each processing unit performs a processing looping in an order of the next execution task selection processing unit 103, the next execution task waiting processing unit 104, the task wake-up processing unit 105, the next execution task selection processing unit 103, . . . . The synchronous core processing unit 101 executes the core migration processing unit 106 in preference to the looping processing when there is a core migration request from the task while performing the looping processing of the processing units 103 to 105.

The quasi-synchronous core processing unit 108 includes an execution task queue 109, a next execution task selection processing unit 110, a task wake-up processing unit 111, a core migration processing unit 112, and a core migration request reception unit 113. In the quasi-synchronous core processing unit 108, each processing unit performs a processing looping in an order of the next execution task selection processing unit 110, the task wake-up processing unit 111, the next execution task selection processing unit 110, . . . . The quasi-synchronous core processing unit 108 executes the core migration processing unit 112 in preference to the looping processing when there is a core migration request from the task while performing the looping processing of the processing units 110 and 111.

Therefore, the synchronous core processing unit 101 executes the same program as a program executed by the computer Y211 (the other computer) for each task at a synchronization timing synchronized with the synchronous core processing unit 101 included in the computer Y211, and migrates the program being executed for which migration is requested according to characteristics of the program to the quasi-synchronous core processing unit 108. Next, the quasi-synchronous core processing unit 108 executes the program migrated from the synchronous core processing unit 101, and then migrates the program to the synchronous core processing unit 101. Then, the synchronous core processing unit 101 outputs, to the output comparison machine 251, an execution result obtained by executing the program migrated from the quasi-synchronous core processing unit 108 at the synchronization timing. Here, the program executed by the synchronous core processing unit 101 at the synchronization timing is characterized by a nondeterministic processing in which unless the nondeterministic processing is executed in synchronization with the computer Y211 (the other computer), output results are not the same even if input values are the same. When the nondeterministic processing is executed in synchronization with the computer Y211 (the other computer) and the input values are the same, the output results are the same. The program migrated from the synchronous core processing unit 101 to the quasi-synchronous core processing unit 108 is characterized by a deterministic processing in which output results are the same if input values are the same.

Plural quasi-synchronous core processing units 108 may exist depending on the number of cores of the CPU 202. For example, plural quasi-synchronous core processing units 108 may exist with respect to one synchronous core processing unit 101, and the plural quasi-synchronous core processing units 108 may be identified by specific numbers or the like. In this case, the synchronous core processing unit 101 may migrate a task B for which a core migration request 161 is made to the quasi-synchronous core processing unit 108 specified by a number or the like, or to the quasi-synchronous core processing unit 108 having a relatively low load.

<Operation Example of Synchronous Core Processing Unit 101>

Here, a queue included in the synchronous core processing unit 101 of the OS 100 and a detailed operation example of each processing unit will be described.

The execution task queue 102 (an example of a first program management unit) connects a program to the queue for each task and manages tasks waiting to be executed for each priority. FIG. 2 shows an aspect in which tasks "A" and "B" are connected to the execution task queue 102. In the execution task queue 102, since an upper task has a higher priority, the task "A" is executed in preference to the task "B".

The next execution task selection processing unit 103 (an example of a first selection processing unit) selects a task that is in the same order and is the earliest task waiting to be executed on the computers X201 and 211 among tasks that can be executed in the execution task queue 102.

The next execution task waiting processing unit 104 (an example of a waiting processing unit) waits for a start of execution of a task that can be executed next to the task selected by the next execution task selection processing unit 103 with the synchronous core processing unit 121 included in the computer Y211. Therefore, the next execution task waiting processing unit 104 exchanges information on the task retrieved from the execution task queue 102 by the next execution task selection processing unit 103 with the next execution task waiting processing unit 124 of the OS 120 via the synchronization data communication path 140. Then, the next execution task waiting processing unit 104 waits within any timeout period until the same task becomes executable in the same order in synchronization cores of at least two or more computers.

The task wake-up processing unit 105 (an example of a first program execution unit) wakes up and executes a task selected by the next execution task waiting processing unit 104 at the synchronization timing. The task executed by the task wake-up processing unit 105 is a task determined to be executable in the same order in the synchronization cores of at least two or more computers.

The synchronous core processing unit 101 executes the next execution task selection processing unit 103 again when the execution of the task woken up by the task wake-up processing unit 105 ends or is interrupted. The next execution task selection processing unit 103 selects a task to be executed next from the execution task queue 102 and executes the task. The next execution task selection processing unit 103 selects and continues processing a task to be executed next until there are no more tasks connected to the execution task queue 102.

The core migration processing unit 106 (an example of a first migration processing unit) migrates a task for which the core migration request reception unit 107 receives a migration request to the quasi-synchronous core processing unit 108. Here, the core migration processing unit 106 can instruct a task received by the core migration request reception unit 107 to migrate to any migration destination (in the present embodiment, the quasi-synchronous core processing unit 108) designated by a task that makes the migration request.

In this case, the core migration processing unit 106 migrates and connects the task received by the core migration request reception unit 107 to the execution task queue 109 at any migration destination (quasi-synchronous core processing unit 108) specified by the task that makes the migration request based on an instruction content from the core migration request reception unit 107. Here, when there are plural quasi-synchronous core processing units that can be selected as the migration destination of the task, the any migration destination specified by the task is, for example, one quasi-synchronous core processing unit selected from the plural quasi-synchronous core processing units.

The core migration request reception unit 107 (an example of a first migration request reception unit) receives a core migration request from a task being executed. Here, the core migration request reception unit 107 can receive the migration request from the task at any timing during execution of the task. Then, the core migration request reception unit 107 conveys a content of the received core migration request to the core migration processing unit 106. Then, the core migration request reception unit 107 executes the core migration processing unit 106 between a time when the task wake-up processing unit 105 executes a task and a time when the next execution task selection processing unit 103 selects a task to be executed next.

<Operation Example of Quasi-Synchronous Core Processing Unit 108>

Next, a queue included in the quasi-synchronous core processing unit 108 and a detailed operation example of each processing unit will be described.

Similar to the execution task queue 102 of the synchronous core processing unit 101, the execution task queue 109 (an example of a second program management unit) connects a program to the queue for each task and manages tasks waiting to be executed for each priority. FIG. 2 shows an aspect in which a task "F" is connected to the execution task queue 109.

The next execution task selection processing unit 110 (an example of a second selection processing unit) selects a task that is the earliest task waiting to be executed among tasks that can be executed in the execution task queue 109.

The task wake-up processing unit 111 (an example of a second program execution unit) wakes up and executes the task selected by the next execution task selection processing unit 110.

The core migration processing unit 112 (an example of a second migration processing unit) migrates a task for which the core migration request reception unit 113 receives a migration request to the synchronous core processing unit 101. Here, the core migration processing unit 112 migrates the task to a migration source of the task. Therefore, based on an instruction content from the core migration request reception unit 113, the core migration processing unit 112 connects an instructed task to the execution task queue 102 of the instructed synchronous core processing unit 101.

Similar to the core migration request reception unit 107 of the synchronous core processing unit 101, the core migration request reception unit 113 (an example of a second migration request reception unit) receives the migration request from the task being executed by the task wake-up processing unit 111. The core migration request reception unit 113 can receive the migration request from the task at any timing during execution of the task. Then, the core migration request reception unit 113 conveys a content of the core migration request to the core migration processing unit 112. In this case, the core migration request reception unit 113 can receive the core migration request from the task being executed at any timing. Then, the core migration request reception unit 113 executes the core migration processing unit 112 between a time when the task wake-up processing unit 111 wakes up and executes a task and a time when the next execution task selection processing unit 110 selects a task to be executed next.

<Configuration Example of OS 120>

Next, a configuration example of the OS 120 will be described. Similar to the computer X201, the computer Y211 includes the synchronous core processing unit 121 and the quasi-synchronous core processing unit 128 that can switch programs for each task (an example of a predetermined execution unit) managed by the OS 120 and execute plural programs in parallel.

Similar to the synchronous core processing unit 101 of the OS 100, the synchronous core processing unit 121 includes an execution task queue 122, a next execution task selection processing unit 123, the next execution task waiting processing unit 124, a task wake-up processing unit 125, a core migration processing unit 126, and a core migration request reception unit 127. Each processing unit performs a processing looping in an order of the next execution task selection processing unit 123, the next execution task waiting processing unit 124, the task wake-up processing unit 125, the next execution task selection processing unit 123, . . . . The synchronous core processing unit 121 executes the core migration processing unit 126 in preference to the looping processing when there is a core migration request from the task while performing the looping processing of the processing units 123 to 125.

Similar to the quasi-synchronous core processing unit 108 of the OS 100, the quasi-synchronous core processing unit 128 includes an execution task queue 129, a next execution task selection processing unit 130, a task wake-up processing unit 131, a core migration processing unit 132, and a core migration request reception unit 133. Each processing unit performs a processing looping in an order of the next execution task selection processing unit 130, the task wake-up processing unit 131, the next execution task selection processing unit 130, . . . . The quasi-synchronous core processing unit 128 executes the core migration processing unit 132 in preference to the looping processing when there is a core migration request from the task while performing the looping processing of the processing units 130 and 131.

Therefore, the synchronous core processing unit 121 executes the same program for each task at a synchronization timing synchronized with the synchronous core processing unit 101 included in the computer X201, and migrates the program being executed for which migration is requested according to characteristics of the program to the quasi-synchronous core processing unit 128. Next, the quasi-synchronous core processing unit 128 executes the program migrated from the synchronous core processing unit 121, and then migrates the program to the synchronous core processing unit 121. Then, the synchronous core processing unit 121 outputs, to the output comparison machine 251, an execution result obtained by executing the program migrated from the quasi-synchronous core processing unit 128.

Plural quasi-synchronous core processing units 128 may exist depending on the number of cores of the CPU 212. For example, plural quasi-synchronous core processing units 128 may exist with respect to one synchronous core processing unit 121, and the plural quasi-synchronous core processing units 128 may be identified by specific numbers or the like. In this case, the synchronous core processing unit 121 may migrate the task B for which a core migration request 162 is made to the quasi-synchronous core processing unit 128 specified by a number or the like, or to the quasi-synchronous core processing unit 128 having a relatively low load.

The synchronous core processing unit 121 and the quasi-synchronous core processing unit 128 running on the OS 120 of the computer Y211 have the same components as the synchronous core processing unit 101 and the quasi-synchronous core processing unit 108 running on the OS 100 of the computer X201, respectively.

<Operation Example of Synchronous Core Processing Unit 121>

Here, a queue included in the synchronous core processing unit 121 of the OS 120 and a detailed operation example of each processing unit will be described.

The execution task queue 122 (an example of the first program management unit) connects a program to the queue for each task and manages tasks waiting to be executed for each priority. FIG. 2 shows an aspect in which the tasks "A" and "B" are connected to the execution task queue 122. In the execution task queue 122, since an upper task has a higher priority, the task "A" is executed in preference to the task "B".

The next execution task selection processing unit 123 (an example of the first selection processing unit) selects a task that is in the same order and is the earliest tasks waiting to be executed on the computers X201 and 211 among tasks that can be executed in the execution task queue 122.

The next execution task waiting processing unit 124 (an example of the waiting processing unit) waits for a start of execution of a task that can be executed next to the task selected by the next execution task selection processing unit 123 with the synchronous core processing unit 101 included in the computer X201. Therefore, the next execution task waiting processing unit 124 exchanges information on the task retrieved from the execution task queue 122 by the next execution task selection processing unit 123 with the next execution task waiting processing unit 104 of the OS 100 via the synchronization data communication path 140. Then, the next execution task waiting processing unit 124 waits within any timeout period until the same task becomes executable in the same order in synchronization cores of at least two or more computers.

The task wake-up processing unit 125 (an example of the first program execution unit) wakes up and executes a task selected by the next execution task selection processing unit 123 at the synchronization timing. The task executed by the task wake-up processing unit 125 is a task determined to be executable in the same order in the synchronization cores of at least two or more computers.

The synchronous core processing unit 121 executes the next execution task selection processing unit 123 again when the execution of the task woken up by the task wake-up processing unit 125 ends or is interrupted. The next execution task selection processing unit 123 selects a task to be executed next from the execution task queue 122 and executes the task. The next execution task selection processing unit 123 selects and continues processing a task to be executed next until there are no more tasks connected to the execution task queue 122.

The core migration processing unit 126 (an example of the first migration processing unit) migrates a task for which the core migration request reception unit 127 receives a migration request to the quasi-synchronous core processing unit 128. Here, the core migration processing unit 126 can instruct a task received by the core migration request reception unit 127 to migrate to any migration destination designated by a task that makes the migration request. In this case, the core migration processing unit 126 migrates and connects the task received by the core migration request reception unit 127 to the execution task queue 129 at any migration destination (quasi-synchronous core processing unit 128 in the present embodiment) specified by the task that makes the migration request based on an instruction content from the core migration request reception unit 127.

The core migration request reception unit 127 (an example of the first migration request reception unit) receives a core migration request from a task being executed. Here, the core migration request reception unit 127 can receive the migration request from the task at any timing during execution of the task. Then, the core migration request reception unit 127 conveys a content of the received core migration request to the core migration processing unit 126. In this case, the core migration request reception unit 127 can receive the core migration request from the task being executed at any timing during execution of the task. Then, the core migration request reception unit 127 executes the core migration processing unit 126 between a time when the task wake-up processing unit 125 wakes up and executes a task and a time when the next execution task selection processing unit 123 selects a task to be executed next.

<Operation Example of Quasi-Synchronous Core Processing Unit 128>

Next, a queue included in the quasi-synchronous core processing unit 128 and a detailed operation example of each processing unit will be described.

Similar to the execution task queue 122 of the synchronous core processing unit 121, the execution task queue 129 (an example of the second program management unit) connects a program to the queue for each task and manages tasks waiting to be executed for each priority. FIG. 2 shows an aspect in which the task "F" is connected to the execution task queue 129.

The next execution task selection processing unit 130 (an example of the second selection processing unit) selects a task that is the earliest task waiting to be executed among tasks that can be executed in the execution task queue 129.

The task wake-up processing unit 131 wakes up and executes the task selected by the next execution task selection processing unit 130.

The core migration processing unit 132 (an example of the second migration processing unit) migrates a task for which the core migration request reception unit 133 receives a migration request to the synchronous core processing unit 121. Here, the core migration processing unit 132 migrates the task to a migration source of the task. Therefore, based on an instruction content from the core migration request reception unit 133, the core migration processing unit 132 connects an instructed task to the execution task queue 122 of the instructed synchronous core processing unit 121.

Similar to the core migration request reception unit 127 of the synchronous core processing unit 121, the core migration request reception unit 133 (an example of the second migration request reception unit) receives the migration request from the task being executed by the task wake-up processing unit 131. The core migration request reception unit 133 can receive the migration request from the task at any timing during execution of the task. Then, the core migration request reception unit 133 conveys a content of the core migration request to the core migration processing unit 132. Then, the core migration request reception unit 133 executes the core migration processing unit 132 between a time when the task wake-up processing unit 131 wakes up and executes a task and a time when the next execution task selection processing unit 130 selects a task to be executed next.

Here, a content of each processing will be described with reference to a time chart shown on a lower side of FIG. 2 for a specific example of a processing in which tasks being executed by the synchronous core processing units 101 and 121 are moved to the quasi-synchronous core processing units 108 and 128 at any timing, and after the processing is continued, returned to the synchronous core processing units 101 and 121 at any timing to continue the processing.

A time chart 150 of the quasi-synchronous core processing unit 108 of the computer X201 and a time chart 151 of the synchronous core processing unit 101 of the computer X201 are shown in an order from a left side of the time chart. A time chart 152 of the synchronous core processing unit 121 of the computer Y211 and a time chart 153 of the quasi-synchronous core processing unit 128 of the computer Y211 are shown.

The next execution task waiting processing unit 104 of the computer X201 and the next execution task waiting processing unit 124 of the computer Y211 wait for a next execution task via the synchronization data communication path 140 (task synchronization). This aspect is shown in each processing of the following task synchronization timings 180 to 185. This aspect is abbreviated as "task synchronization" in the description and drawings.

Task synchronization 180 indicates that the computer X201 and the computer Y211 complete waiting for the task A as a next execution task.

Task synchronization 181 indicates that the computer X201 and the computer Y211 complete waiting for the task B as a next execution task.

Task synchronization 182 indicates that the computer X201 and the computer Y211 complete waiting for a task C as a next execution task.

Task synchronization 183 indicates that the computer X201 and the computer Y211 complete waiting for a task D as a next execution task.

Task synchronization 184 indicates that the computer X201 and the computer Y211 complete waiting for the task B as a next execution task.

Task synchronization 185 indicates that the computer X201 and the computer Y211 complete waiting for a task E as a next execution task.

The task F and a task G executed by the quasi-synchronous core processing unit 108 of the computer X201 and tasks H, I, J, and K executed by the quasi-synchronous core processing unit 128 of the computer Y211 are not targets of the synchronous processing. The output comparison machine 251 does not compare and collate execution results of these tasks.

In this case, the time chart 151 of the synchronous core processing unit 101 of the computer X201 shows examples of execution start timings and execution end timings of the tasks A to E, and the time chart 150 of the quasi-synchronous core processing unit 108 shows examples of execution start timings and execution end timings of the tasks B, F, and G. Furthermore, the time charts 150 and 151 show examples of the core migration requests 160 and 161 respectively.

In the OS 100 of the computer X201, the task B is executed between the tasks F and G executed in the quasi-synchronous core processing unit 108. Here, a migration processing of the task B in the OS 100 will be described.

A quasi-synchronous core event T1X 170 of the computer X201 indicates a timing at which the quasi-synchronous core processing unit 108 starts a deterministic processing of the task B that is migrated from the synchronous core processing unit 101 to the quasi-synchronous core processing unit 108 on the computer X201.

A quasi-synchronous core event T2X 171 of the computer X201 indicates a timing at which the deterministic processing of the task B on the computer X201 is finished and a migration request of the task B from the quasi-synchronous core processing unit 108 to the synchronous core processing unit 101 is executed.

A quasi-synchronous core event T3X 172 of the computer X201 indicates a timing at which the synchronous core processing unit 101 starts a nondeterministic processing of the task B that is migrated from the quasi-synchronous core processing unit 108 to the synchronous core processing unit 101 on the computer X201.

As shown in the time chart 151, execution of the task B is started after execution of the task A is ended in the synchronous core processing unit 101.

The core migration request 161 indicates a core migration request executed at any timing from the task B being executed by the synchronous core processing unit 101 of the computer X201. According to this core migration request, the task B is migrated from the synchronous core processing unit 101 to the quasi-synchronous core processing unit 108. An output result of the task B executed by the synchronous core processing unit 101 is not input to the task B migrated to the quasi-synchronous core processing unit 108.

As shown in the time chart 150, after execution of the task F is ended in the quasi-synchronous core processing unit 108, a deterministic processing of the task B migrated from the synchronous core processing unit 101 is started.

The core migration request 160 indicates a core migration request executed at any timing from the task B being executed by the quasi-synchronous core processing unit 108 of the computer X201. According to this core migration request, the task B is migrated from the quasi-synchronous core processing unit 108 to the synchronous core processing unit 101.

Then, as shown in the time chart 151, after execution of the tasks C and D is ended in the synchronous core processing unit 101, a nondeterministic processing of the task B migrated from the quasi-synchronous core processing unit 108 is started.

The time chart 152 of the synchronous core processing unit 121 of the computer X201 of the computer Y211 shows examples of the execution start timings and the execution end timings of the tasks A to E, and the time chart 153 of the quasi-synchronous core processing unit 128 shows examples of the execution start timings and the execution end timings of the tasks B, and H to K. Furthermore, the time charts 152 and 153 show examples of the core migration requests 162 and 163 respectively.

In the OS 120 of the computer Y211, the task B is executed between the tasks I and J executed in the quasi-synchronous core processing unit 128. Here, a migration processing of the task B in the OS 120 will be described.

A quasi-synchronous core event T1Y 173 of the computer Y211 indicates a timing at which the quasi-synchronous core processing unit 128 starts a deterministic processing of the task B that is migrated from the synchronous core processing unit 121 to the quasi-synchronous core processing unit 128 on the computer Y211.

A quasi-synchronous core event T2Y 174 of the computer Y211 indicates a timing at which the deterministic processing of the task B on the computer Y211 is finished and a migration request of the task B from the quasi-synchronous core processing unit 128 to the synchronous core processing unit 121 is executed.

A quasi-synchronous core event T3Y 175 of the computer Y211 indicates a timing at which the synchronous core processing unit 121 starts a nondeterministic processing of the task B that is migrated from the quasi-synchronous core processing unit 128 to the synchronous core processing unit 121 on the computer Y211.

As shown in the time chart 152 in the OS 120 of the computer Y211, the nondeterministic processing of the task B is started after execution of the task A is ended in the synchronous core processing unit 121.

The core migration request 162 indicates a core migration request executed at any timing from the task B being executed by the synchronous core processing unit 121 of the computer Y211. According to this core migration request, the task B is migrated from the synchronous core processing unit 121 to the quasi-synchronous core processing unit 128.

As shown in the time chart 153, after execution of the task I is ended in the quasi-synchronous core processing unit 128, a deterministic processing of the task B migrated from the synchronous core processing unit 121 is started.

The core migration request 163 indicates a core migration request executed at any timing from the task B being executed by the quasi-synchronous core processing unit 128 of the computer Y211. According to this core migration request, the task B is migrated from the quasi-synchronous core processing unit 128 to the synchronous core processing unit 121.

Then, as shown in the time chart 152, after execution of the tasks C and D is ended in the synchronous core processing unit 101, a nondeterministic processing of the task B migrated from the quasi-synchronous core processing unit 128 is started.

Based on the migration processing of the task B described above, a processing of each task executed by the computers X201 and Y211 will be described.

First, the task A whose start timing is determined by the task synchronization 180 is executed by the task wake-up processing unit 105 of the synchronization core processing unit 101 of the computer X201, and is executed by the task wake-up processing unit 125 of the synchronous core processing unit 121 of the computer Y211.

When the execution of the task A by the synchronous core processing unit 101 of the computer X201 and the synchronous core processing unit 121 of the computer Y211 is ended or interrupted, the task B is selected by the task synchronization 181. Then, the synchronous core processing unit 101 of the computer X201 and the synchronous core processing unit 121 of the computer Y211 start executing the processing of the task B, separately.

While the task B is executed on the computer X201, the task B executes the core migration request 161 to the quasi-synchronous core processing unit 108 at a start point of the deterministic processing. The start point is, for example, a parameter defined for each type of processing in a program executed as the task B. At approximately the same time, the task B of the computer Y211 executes the core migration request 162 to the quasi-synchronous core processing unit 128.

According to a content of the core migration request 161, the core migration request reception unit 107 that receives the core migration request 161 from the task B of the computer X201 starts the processing of the core migration processing unit 106. The core migration processing unit 106 connects the task B to the execution task queue 109 of the quasi-synchronous core processing unit 108.

Similarly, according to a content of the core migration request 162, the core migration request reception unit 127 that receives the core migration request 162 from the task B of the computer Y211 starts the processing of the core migration processing unit 126. The core migration processing unit 126 connects the task B to the execution task queue 129 of the quasi-synchronous core processing unit 128.

Due to the migration of the task B, the execution of the task B is interrupted in the core migration request 161 of the computer X201 and in the core migration request 162 of the computer Y211. Therefore, the computers X201 and Y211 execute the task synchronization 182 to select a next task, and select the task C as a next execution task. The synchronous core processing unit 101 of the computer X201 and the synchronous core processing unit 121 of the computer Y211 start execution of the task C at approximately the same time.

In the quasi-synchronous core processing unit 108 of the computer X201, when execution of the task F is ended at the timing of the quasi-synchronous core event T1X 170, the next execution task selection processing unit 110 selects the task B from the execution task queue 109, and the task wake-up processing unit 111 starts executing the task B.

In the quasi-synchronous core processing unit 128 of the computer Y211, when execution of the task I is ended at the timing of the quasi-synchronous core event T1Y 173, the next execution task selection processing unit 130 selects the task B from the execution task queue 129, and the task wake-up processing unit 131 starts executing the task B.

In this case, when the task B is connected to the execution task queues 109 and 129, the timings of the quasi-synchronous core events T1X 170 and T1Y 173 may be different. Therefore, there is no need for the quasi-synchronous core processing units 108 and 128 to match the timing between the computer X201 and the computer Y211.

Next, in the quasi-synchronous core processing unit 108 of the computer X201, the task B executes the core migration request 160 at the timing of the quasi-synchronous core event T2X 171. When the core migration request reception unit 113 of the computer X201 receives the core migration request 160, the core migration processing unit 112 connects the task B to the execution task queue 102 of the synchronous core processing unit 101.

On the other hand, in the quasi-synchronous core processing unit 128 of the computer Y211, the task B executes the core migration request 163 at the timing of the quasi-synchronous core event T2Y 174. When the core migration request reception unit 133 of the computer Y211 receives the core migration request 163, the core migration processing unit 132 connects the task B to the execution task queue 122 of the synchronous core processing unit 121.

In this case, even when the task B is connected to the execution task queues 102 and 122, the timings of the quasi-synchronous core events T2X 171 and T2Y 174 may be different. Therefore, there is no need for the quasi-synchronous core processing units 108 and 128 to match the timing between the computer X201 and the computer Y211.

As shown in the time chart 150 of the computer X201, the task synchronization 183 is a timing after the core migration request 160 of the task B. Therefore, the task B is connected to the execution task queue 102 after the quasi-synchronous core event T2X 171.

However, as shown in the time chart 152 of the computer Y211, the quasi-synchronous core processing unit 128 is executing the task B at the timing of the task synchronization 183. In this case, since the timing of the core migration request 163 of the task B is after the task synchronization 183, the task B is not yet connected to the execution task queue 122 at the timing of the task synchronization 183.

Therefore, in the task synchronization 183, the next execution task selection processing unit 103 of the computer X201 and the next execution task selection processing unit 123 of the computer Y211 determine a task to be executed next not as the task B, but as the task D, which has a next highest priority after the task B. In this case, an allowable range of a time difference between the quasi-synchronous core event T2X 171 and the quasi-synchronous core event T2Y 174 can be set as any timeout period.

In this case, since the deterministic processing of the task B is executed by the quasi-synchronous core processing units 108 and 128, timings of the core migration requests 160 and 163 may not match. Therefore, the next execution task selection processing unit 103 of the computer X201 classifies tasks waiting to be executed that are connected to the execution task queue 102 into a task connected to the execution task queue 102 after being generated by the synchronous core processing unit 101 or execution of which being interrupted, and a task migrated from the quasi-synchronous core processing unit 108, and then selects a task. Then, the next execution task waiting processing unit 104 sets a time range of waiting for a start of execution of the task migrated from the quasi-synchronous core processing unit 108 longer than a time range of waiting for a start of execution of the task connected to the execution task queue 102 after being generated by the synchronous core processing unit 101 or execution of which being interrupted.

Similarly, the next execution task selection processing unit 123 of the computer Y211 classifies tasks waiting to be executed that are connected to the execution task queue 122 into a task connected to the execution task queue 122 after being generated by the synchronous core processing unit 121 or the execution of which being interrupted, and a task migrated from the quasi-synchronous core processing unit 128, and then selects a task. Then, the next execution task waiting processing unit 124 sets a time range of waiting for a start of execution of the task migrated from the quasi-synchronous core processing unit 128 longer than a time range of waiting for a start of execution of the task connected to the execution task queue 122 after being generated by the synchronous core processing unit 121 or the execution of which being interrupted.

If a time for the task migrated from the quasi-synchronous core processing units 108 and 128 to return to the synchronous core processing unit 101 and 121 is longer than the set time range, another task having a high priority that is connected to the execution task queues 102 and 122 is executed first. For example, the next execution task waiting processing units 104 and 124 execute another task first when a timing when the task B makes the core migration request 163 from the quasi-synchronous core processing unit 128 exceeds the time range, even if a timing when the task B makes the core migration request 160 from the quasi-synchronous core processing unit 108 is within the time range.

Then, after execution of the other task is ended, if each task B that makes the core migration requests 160 and 163 can be executed, execution of the task B is started. For example, in the synchronous core processing unit 101 of the computer X201 and the synchronous core processing unit 121 of the computer Y211, at the timing of the task synchronization 184 when the execution of the task D is ended or interrupted, the task B is woken up and executed as a next execution task of the synchronous cores of the computers X201 and Y211. That is, the quasi-synchronous core events T3X 172 and T3Y 175 are executed at approximately the same time.

In the synchronous core processing unit 101 of the computer X201 and the synchronous core processing unit 121 of the computer Y211, when the execution of the task B is ended, the next execution task is determined as the task E at the timing of the task synchronization 165, and the task E is woken up.

Based on the above flow, the nondeterministic processing of the task B is executed by the synchronous core processing units 101 and 121, and after the quasi-synchronous core processing units 108 and 128 process only the deterministic processing, the synchronous core processing units 101 and 121 process the task again, so that output timings of the execution results can match.

In the computer system 10 according to the embodiment described above, the synchronous core processing units 101 and 121 can execute the same task in the same order among the plural computers X201 and Y211. The task being executed by the synchronous core processing units 101 and 121 can be migrated to the quasi-synchronous core processing units 108 and 128 at any timing to continue to be processed, and can be migrated to the synchronous core processing units 101 and 121 again to end the processing.

The OS of each computer classifies the task processing into the deterministic processing or the nondeterministic processing. Then, the nondeterministic processing task is always executed synchronously on the synchronous core processing units 101 and 121, and only the deterministic processing is executed quasi-synchronously on the quasi-synchronous core processing units 108 and 128. In this case, in addition to the synchronous core processing units 101 and 121, the quasi-synchronous core processing units 108 and 128 can also execute the task. Therefore, a processing efficiency per unit time of a task that can be executed by all the plural cores of each computer is improved. Therefore, in the computer system 10, a processing performance of each computer can be improved without changing a hardware configuration of each computer.

The quasi-synchronous core processing units 108 and 128 collectively execute the deterministic processing. For this reason, a task whose nondeterministic processing is being executed synchronously requests migration to another core by itself. By this migration request, a task being synchronously executed by the synchronous core processing units 101 and 121 can be migrated to the quasi-synchronous core processing units 108 and 128 at the start point of the deterministic processing. At an end point when the quasi-synchronous core processing units 108 and 128 end the deterministic processing, the task can be returned to the synchronous core processing units 101 and 121 to continue the processing.

As shown in FIG. 2, the execution of the task B including the deterministic processing and the nondeterministic processing is performed by the synchronous core processing unit synchronously and by the quasi-synchronous core processing unit quasi-synchronously, so that the execution results of the task B can be output in a matching manner.

There is no need for the quasi-synchronous core processing units 108 and 128 to synchronize the synchronization timing with other computers or to share information such as the synchronization data when executing the deterministic processing. Therefore, it is not necessary to construct a new network for synchronizing the quasi-synchronous core processing units 108 and 128. Then, it is possible to implement a task execution method that improves the processing performance of the computer system 10 as a loosely coupled fault tolerant computer without changing the communication band of the network 240 on which the synchronization data communication path 140 is provided and computational resources of the output comparison machine 251 that performs the collation processing.

The invention is not limited to the above-described embodiment, and it goes without saying that various other application examples and modifications can be obtained as long as the gist of the invention described in the claims is not deviated.

For example, the above-described embodiment describes the configuration of the system in detail and specifically in order to explain the invention in an easy-to-understand manner, and is not necessarily limited to one including all the described configurations. It is also possible to add other configurations to the configuration of the present embodiment, delete a part of the configuration of the present embodiment or replace a part of the configuration of the present embodiment with another configuration.

Control lines or information lines indicate what is considered necessary for description, and not all the control lines or information lines are necessarily shown in a product. In practice, it may be considered that almost all configurations are connected to each other.

REFERENCE SIGN LIST 10 computer system
100, 120 OS
101, 121 synchronous core processing unit
102, 109, 122, 129 execution task queue
103, 110, 123, 130 next execution task selection processing unit
104, 124 next execution task waiting processing unit
105, 111, 125, 131 task wake-up processing unit
106, 112, 126, 132 core migration processing unit
107, 113, 127, 133 core migration request reception unit
108, 128 quasi-synchronous core processing unit
201 computer X
211 computer Y
251 output comparison machine

The invention claimed is:

1. A computer system, comprising:
a computer including a synchronous core processing unit and a quasi-synchronous core processing unit whose operation is managed by an operating system, the synchronous core processing unit and the quasi-synchronous core processing unit being configured to switch a program for a predetermined execution unit and execute a plurality of the programs in parallel; and
a comparison machine configured to compare execution results of the program executed by a plurality of the computers connected via a network and output a comparison result, wherein
information on the program executed by the computer is exchanged between the computer and another computer within a specified time range via the network,
the synchronous core processing unit executes the same program as a program executed by the other computer for the execution unit at a synchronization timing synchronized with a synchronous core processing unit included in the other computer, and migrates the program being executed for which migration is requested according to characteristics of the program to the quasi-synchronous core processing unit,
the quasi-synchronous core processing unit executes the program migrated from the synchronous core processing unit, and then migrates the program to the synchronous core processing unit, and
the synchronous core processing unit outputs, to the comparison machine, the execution result obtained by executing the program migrated from the quasi-synchronous core processing unit at the synchronization timing.

2. The computer system according to claim 1, wherein
the program executed by the synchronous core processing unit at the synchronization timing is characterized by a nondeterministic processing in which output results are not the same even if input values are the same unless the nondeterministic processing is executed in synchronization with the other computer, and output results are the same when the nondeterministic processing is executed in synchronization with the other computer and input values are the same, and
the program migrated from the synchronous core processing unit to the quasi-synchronous core processing unit is characterized by a deterministic processing in which output results are the same when input values are the same.

3. The computer system according to claim 2, wherein
the synchronous core processing unit includes
a first program management unit configured to manage the program by connecting the program to a queue for each execution unit,
a first selection processing unit configured to select the program that is in the same order and is the earliest program waiting to be executed on the plurality of computers among the programs to be executed in the first program management unit,
a first program execution unit configured to execute the program selected by the first selection processing unit at the synchronization timing,
a first migration request reception unit configured to receive a migration request from the program being executed by the first program execution unit,
a first migration processing unit configured to migrate the program for which the first migration request reception unit receives the migration request to the quasi-synchronous core processing unit, and
a waiting processing unit configured to wait for a start of execution of the program to be executed next to the program selected by the first selection processing unit with the synchronous core processing unit provided in the other computer.

4. The computer system according to claim 3, wherein
the first selection processing unit classifies the programs waiting to be executed and connected to the first program management unit into the program connected to the first program management unit after being generated by the synchronous core processing unit or execution of which being interrupted, and the program migrated from the quasi-synchronous core processing unit, and selects a program, and
the waiting processing unit sets a time range of waiting for a start of execution of the program migrated from the quasi-synchronous core processing unit longer than a time range of waiting for a start of execution of the program connected to the first program management unit after being generated by the synchronous core processing unit or execution of which being interrupted.

5. The computer system according to claim 3, wherein
the quasi-synchronous core processing unit includes
a second program management unit configured to manage the program by connecting the program to a queue for each execution unit,
a second selection processing unit configured to select the program that is the earliest program waiting to be executed among the programs to be executed in the second program management unit,
a second program execution unit configured to execute the program selected by the second selection processing unit,
a second migration request reception unit configured to receive a migration request from the program being executed by the second program execution unit, and
a second migration processing unit configured to migrate the program for which the second migration request reception unit receives the migration request to the synchronous core processing unit,
the first migration processing unit migrates the program received by the first migration request reception unit to any migration destination designated by the program that makes the migration request, and
the second migration processing unit migrates the program to a migration source of the program.

6. The computer system according to claim 5, wherein
the first migration request reception unit receives the migration request from the program at any timing during execution of the program, and
the first migration processing unit migrates and connects the program received by the first migration request reception unit to the second program management unit of any migration destination designated by the program that makes the migration request.

7. A program execution method to be executed in a computer system,
the computer system including
a computer including a synchronous core processing unit and a quasi-synchronous core processing unit whose operation is managed by an operating system, the synchronous core processing unit and the quasi-synchronous core processing unit being configured to switch a program for a predetermined execution unit and execute a plurality of the programs in parallel, and a comparison machine configured to compare execution results of the program executed by a plurality of the computers connected via a network and output a comparison result, information on the program executed by the computer being exchanged between the computer and another computer within a specified time range via the network, the program execution method comprising:

a processing in which the synchronous core processing unit executes the same program as a program executed by the other computer for the execution unit at a synchronization timing synchronized with a synchronous core processing unit included in the other computer, and migrates the program being executed for which migration is requested according to characteristics of the program to the quasi-synchronous core processing unit, a processing in which the quasi-synchronous core processing unit executes the program migrated from the synchronous core processing unit, and then migrates the program to the synchronous core processing unit, and a processing in which the synchronous core processing unit outputs, to the comparison machine, an execution result obtained by executing the program migrated from the quasi-synchronous core processing unit at the synchronization timing.

\* \* \* \* \*